Dec. 19, 1950 — L. B. COURTOT — 2,534,577

VALVE

Filed Sept. 19, 1945

INVENTOR.
LOUIS B. COURTOT
BY Richey & Watts
ATTORNEYS

Patented Dec. 19, 1950

2,534,577

UNITED STATES PATENT OFFICE 2,534,577

VALVE

Louis B. Courtot, Cleveland, Ohio, assignor to The Weatherhead Company, Cleveland, Ohio, a corporation of Ohio Application September 19, 1945, Serial No. 617,274

10 Claims. (Cl. 251—13)

1

My invention relates to valves and has for its principal object the provision of a low-torque valve for vapors, gases and liquids.

It is an object of my invention to provide a valve which may be operated by a rotatable handle or stem, which is relatively small, compact and easily manufactured in comparison with conventional taper plug valves, or straight plug valves, and which avoids the necessity for close tolerances to prevent leakage.

A further object of the invention is to minimize the torque required for operating a valve and to overcome the effects of low temperature in tending to freeze or solidify valve-packing or gasket material and tending to increase the torque required to operate the valve.

A further object is to provide an improved arrangement for rolling a valve closure member onto or away from a valve seat.

Still another object is to cause the pressure of the fluid being controlled to assist in sealing the valve.

Other and further objects, features and advantages of the invention will become apparent as the description proceeds.

In carrying out the invention in accordance with a preferred form thereof, a chamber is provided having one or more lateral ports or apertures for ingress or egress of fluid. A rotor is provided in the chamber in the form of a ring-shaped closure member adapted to be rolled over whichever valve port is to be closed. Suitable means such as a cam is provided for rolling the closure member into or out of port-closing position. Preferably, each valve port or the closure member is faced with resilient or relatively soft gasketing material to prevent leakage and the dimensions are such that the resilient material is placed under compression to insure a leak-tight joint when the closure member is in the port-closing position.

Preferably relief spaces are provided at the sides of the rotor to keep the torque at a low value in opening the flow through the valve port. In order to guard against blocking or wedging of the closure member operating cam in the valve-closing position in the event of the freezing or solidification of the resilient sealing material during low temperature conditions, the cam is spring-loaded so as to provide for reduction of radius thereof in opening the valve.

A better understanding of the invention will be afforded by the following detailed description considered in conjunction with the accompanying drawings in which,

2

Like reference characters are utilized throughout the drawing to designate like parts.

Figure 1:
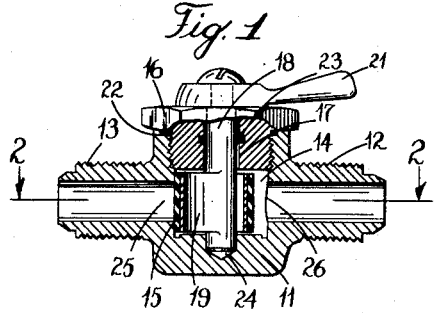
Fig. 1 is a view of an embodiment of my invention shown partially in section as cut by a plane through the rotation axis of the valve stem.
Figure 2:
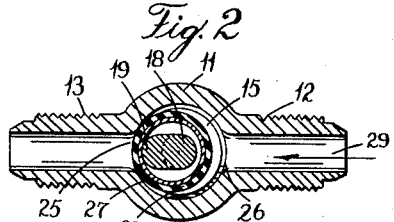
Fig. 2 is a sectional view of the device of Fig. 1 represented as cut by a plane 2—2 perpendicular to the rotation axis of the valve stem showing the rotor in the valve-closed position.
Figure 3:
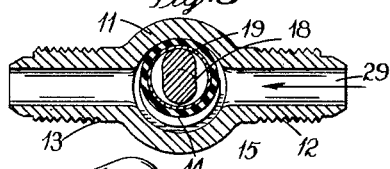
Fig. 3 is a sectional view corresponding to Fig. 2 showing the valve rotor in the open position.

The arrangement illustrated in Figs. 1, 2, and 3 comprises a valve body 11 having nipples 12 and 13 for making inlet and outlet connections, and having a chamber 14 adapted to receive a hollow rotor or valve-closure member 15. The chamber 14 has a threaded opening at the top receiving a nut 16 with a central bore 17 accommodating the valve stem 18. The chamber 14 preferably comprises a substantially cylindrical bore extending through the body 11 only at the upper end.

A cam 19 secured to, or integral with the valve stem 18 is provided for rolling the rotor 15 into open or closed valve positions, and suitable means such as a handle 21 are secured to the stem 18 for rotating it. A packing gland 22 is provided to prevent leakage between the valve body 11 and the nut 16 and a suitable seal such as an O-ring seal 23 is provided for preventing leakage around the valve stem 18. A well 24 is formed in the lower portion of the valve body 11 for receiving the foot of the valve stem 18.

A lateral outlet port 25 is formed at the side of the chamber 14 communicating with the outlet nipple 13, and there is an inlet port 26 which is also preferably a lateral port communicating with the inlet nipple 12. For the sake of compactness, both inlet and outlet ports are at the side of the chamber 14 so as to form lateral ports. However, the invention is not limited thereto, nor is the invention limited to the use of specific ports as inlet and outlet ports. The functions of the ports may be interchanged or the valve may be employed in lines where flow of fluid in either direction may take place. In order to prevent leakage around the valve port when the valve is in a closed position, the surface of the chamber 14 (at least around the valve port), or the surface of the rotor 15 (at least the portion which engages the valve port) is preferably made resilient or faced with a resilient coating. In the specific arrangement illustrated, the rotor 15 is in the form of a hollow cylinder or ring having a backing ring 27 composed of relatively durable, abrasion-resisting, preferably rigid, material such as steel or other metal or a tough durable plastic, for example, and a relatively soft or resilient surface 28 comprising in the specific arrangement illustrated, a ring of soft rubber or rubber-like natural or synthetic material bonded to the backing ring 27.

The torque required to rotate the cam 19 from the position shown in Fig. 2 in which the valve port 25 is closed, is diminished by reason of the fact that the cam 19 is narrower than the valve port 25. If one assumes that the direction of flow of fluid is in the direction of the arrow 29 and the rotor is in the position shown in Fig. 2, the flow of fluid into the valve port 25 is closed by the rotor 15, and the pressure of the fluid entering the valve port 26 helps to seal the valve port 25. The construction is symmetrical so that the same action would be obtained with the flow in the reversed direction if the rotor 19 is in a position 180° from that shown in Fig. 2. Where the pressure of the fluid to be sealed is relatively great, and it is desired to obtain the assistance of the fluid pressure in sealing the valve, it is desirable to operate the valve in such a manner that the closed port is the one away from the entrance of the fluid. However, the invention is not limited to operating the valve in this manner, and if desired, the valve may be closed in the position shown in Fig. 2 with the fluid flowing in the direction opposite from that indicated by the arrow 29.

In order to open the valve port fully in the valve construction shown in Figs. 1, 2 and 3, the valve stem 18 and the cam 19 are rotated ninety degrees to the position represented in Fig. 3. In order to obtain the maximum flow of fluid when the valve is in the open position without making the rotor any smaller in diameter than necessary, the difference in diameter between the chamber 14 and the resilient surface of the rotor 15 is made equal to one-half the radius of the outlet port 25. The average cross-sectional area for passage of fluid around the surface 28 of the rotor 15 is thereby made substantially equal to the cross-sectional area of the port 25.

Owing to the resiliency of the coating 28, tight sealing of the port 25 is obtained when the valve is in the closed position without necessitating close tolerances of the dimensions of the various parts of the valve. Furthermore, the parts of the mechanism are relatively easily constructed and assembled, and low torque is required for rotating the handle 21; the construction is quite compact and lends itself readily to interchangeability or reversal of flow of the liquid or fluid to be controlled.

A new sealing face is presented upon each rotation of the valve stem 18 to a new position by reason of the rotation of the sealing member or rotor 15. When the valve is used with most liquids the soft face 28 slides between ports in the manner of a squeegee but rolls when the cam 19 is moved along a port. On the other hand, if the valve is used on air the rotor 15 rolls during the entire travel from port to port.

Valves of the type constructed in accordance with my invention lend themselves readily to operation at a wide variation of temperatures. Where the temperature is expected to fall so low that the soft resilient face 28 of the rotor 15 may be caused to freeze or solidify so as to become virtually a solid, inflexible mass, I prefer to provide a spring-loading arrangement for the cam 19 in order to maintain at a minimum the torque required to turn the valve from the closed position to the open position.

Figure 4:
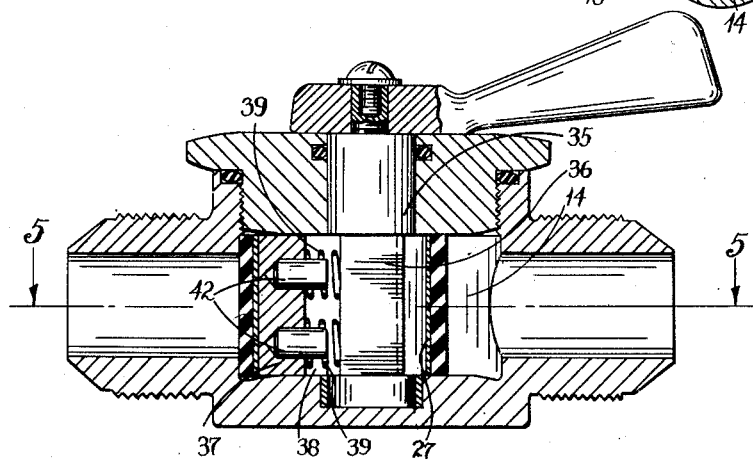
Fig. 4 is a sectional view corresponding to Fig. 1 showing a valve arrangement for over-coming tendency toward increased torque at low temperature, with the rotor represented in the closed position for one valve port.
Figure 5:
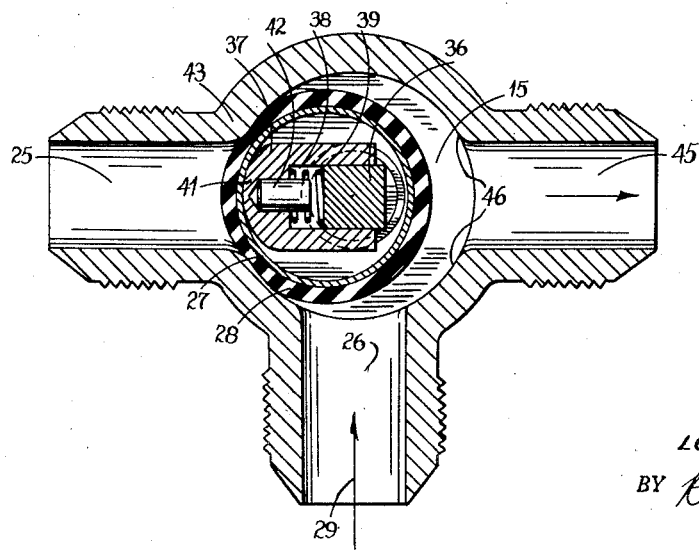
Fig. 5 is a cross-sectional view of the valve of Fig. 4 represented as cut by a plane 5—5 perpendicular to the valve stem showing the port arrangement for a two-way valve.

A suitable spring-loading cam arrangement for operation down to extremely low temperatures is illustrated in Figs. 4 and 5. A valve stem 35 is provided, the central portion of which has been machined to form a square post 36. A separate channel-shaped cam 37 is provided having a slot portion or central channel 38 adapted to fit over parallel sides of the post 36. One or more compression springs 39, depending upon the length of the square portion 36 of the valve stem 35, are provided for pressing the nose portion 41 of the cam 47 against the inner metallic member 27 of the rotor 15. Suitable means such as locating pins 42 set in corresponding sockets are provided for retaining the compression spring means 39.

In the event that the temperature of the fluid or of the surroundings of the valve should fall to such a low value that the portion of the resilient face 28 in contact with the seat 43 around the valve port 25 should be frozen in compressed condition so that the thickness of the resilient face 28 at the valve seat 43 is considerably less than the thickness in the uncompressed portions, there would be a tendency for considerable torque to be required to roll the rotor 15 out of the closed position of the valve to the open position of the valve if the dimensions were such that the cam 37 is in close contact or presses tightly against the inner ring 27 when the valve is in the closed position. In order to overcome the torque which would be required for rotating the cam 37 from the closed position to the open position of the valve under such low temperature conditions, the spring-loading 39 has been provided which permits the cam 37 to recede sufficiently to ride up what amounts to a wedge or incline to the uncompressed portion. Although rubber-like material such as natural soft rubber, and synthetic soft rubber tend to freeze in what appears to be a solid, inflexible condition at low temperatures, after a lapse of time the material (even at such low temperatures) does assume its original dimensions when pressure is relieved. Consequently, after the valve rotor 15 has been rotated to the valve-open position, such as represented by the position of Fig. 3, for example, the portion of the seat 28 which has been compressed against the valve seat 43, expands again to its normal uncompressed condition so that in a subsequent closing of the valve adequate sealing effect is obtained.

Fig. 5 illustrates also the manner of arrangement of parts to obtain a multi-point valve in accordance with my invention. Thus as in the arrangement specifically shown in Fig. 5, there may be a single inlet port 26 and a pair of outlet ports 25 and 45. If desired, the arrangement may also be reversed with the ports 25 and 45 serving as dual inlet ports, and the port 26 serving as a single outlet port. Flow of fluid may be stopped entirely by rolling the rotor 15 over the port 26, and the flow of fluid may be diverted from the port 25 to the port 45 or vice versa by rolling the rotor to the position shown in Fig. 5 or to the position 180° therefrom. Where the direction of fluid flow in a dual outlet valve is such as represented by the arrows shown in Fig. 5, namely out through either the port 25 or the port 45, the cam-loading spring 39 may be relatively light and the pressure of the fluid itself serves to assist in sealing the resilient face 28 against the valve seat 43.

For indefinitely increasing the life of the resilient rotor facing 28 and preventing cutting thereof, the valve seats formed by the intersection of the ports 25, 26 and 45 with the central bore are preferably made with a radius at said intersections such that there is substantially no tendency for the seat material and the resilient facing 28 to be cut as the rotor is rolled out of the position closing the valve port.

I have herein shown and particularly described certain embodiments of my invention and certain methods of operation embraced therein for the purpose of explaining its principle of operation and showing its application, but it will be obvious to those skilled in the art that many modifications and variations are possible, and I aim, therefore, to cover all such modifications and variations as fall within the scope of my invention which is defined in the appended claims.

I claim:

1. A valve comprising a body having a chamber formed therein, a wall portion of said chamber having a cylindrical surface, a port in said wall portion the margin of said port lying within the cylindrical surface of said wall portion, a composite generally annular closure member comprising a thin walled springy backing annulus and a rubber-like cover for said annulus, said closure member having rolling contact with the wall portion of said chamber, said cylindrical wall portion extending at least 90° to one side of said port, control means for rolling said closure member to and from a position overlying said port, said control means comprising a shaft substantially concentric with said chamber wall portion and operator means carried by said shaft engaging the said springy backing annulus, said operator means being of smaller section than the internal diameter of said annulus whereby said annulus may flex as the closure member rolls across said port.

2. A valve comprising a body having a chamber formed therein, a wall portion of said chamber having a cylindrical surface, a port in said wall portion the margin of said port lying within the cylindrical surface of said wall portion, a composite generally annular closure member comprising a thin walled springy backing annulus and a rubber-like cover for said annulus, said closure member having rolling contact with the wall portion of said chamber, said cylindrical wall portion extending at least 90° to one side of said port, control means for rolling said closure member to and from a position overlying said port, said control means comprising a shaft substantially concentric with said chamber wall portion and operator means carried by said shaft engaging the said springy backing annulus, said operator means being of smaller section than the internal diameter of said annulus whereby said annulus may flex as the closure member rolls across said port, said port being relieved around the edges thereof for reducing the torque required to roll the closure member away from said aperture.

3. A valve comprising a body having a chamber formed therein, a wall portion of said chamber having a cylindrical surface, a port in said wall portion the margin of said port lying within the cylindrical surface of said wall portion, a composite generally annular closure member comprising a thin walled springy backing annulus and a rubber-like cover for said annulus, said closure member having rolling contact with the wall portion of said chamber, said cylindrical wall portion extending at least 90° to one side of said port, control means for rolling said closure member to and from a position overlying said port, said control means comprising a shaft substantially concentric with said chamber wall portion and a cam carried by said shaft extending within said closure member and engaging the said springy backing annulus, said cam being of smaller section than the internal diameter of said annulus, and means resiliently urging said cam against said annulus whereby said annulus may flex as the closure member rolls across said port.

4. A valve comprising a body having a chamber formed therein, a wall portion of said chamber having a cylindrical surface, a port in said wall portion the margin of said port lying within the cylindrical surface of said wall portion, a generally annular closure member having a wall portion with an outer diameter less than the diameter of said chamber wall portion and an internal diameter greater than the radius of said chamber wall portion, said closure member having rolling contact with the wall portion of said chamber, said cylindrical wall portion extending at least 90° to one side of said port, control means for rolling said closure member to and from a position overlying said port, said control means comprising a shaft substantially concentric with said chamber wall portion and operator means carried by said shaft locally engaging the said internal wall portion of said closure member over an arc not greater than that encompassed by said port, and yielding means interposed between said closure member and said chamber wall portion in the zone of contact therebetween.

5. A valve comprising a body having a chamber formed therein, a wall portion of said chamber having a cylindrical surface, a port in said wall portion the margin of said port lying within the cylindrical surface of said wall portion, a generally annular closure member having a wall portion with an outer diameter less than the diameter of said chamber wall portion and an internal diameter greater than the radius of said chamber wall portion, said closure member having rolling contact with the wall portion of said chamber, said cylindrical wall portion extending at least 90° to one side of said port, control means for rolling said closure member to and from a position overlying said port, said control means comprising a shaft substantially concentric with said chamber wall portion and a cam carried by said shaft engaging the said internal wall portion of said closure member, said cam being of smaller section than the internal diameter of said closure member, means resiliently urging said cam against said closure member, and yielding means interposed between said closure member and said chamber wall portion in the zone of contact therebetween.

6. A valve comprising a body having a chamber formed therein, a wall portion of said chamber having a cylindrical surface, a port in said wall portion the margin of said port lying within the cylindrical surface of said wall portion, a composite generally annular closure member having a wall portion with an outer diameter less than the diameter of said chamber wall portion and an internal diameter greater than the radius of said chamber wall portion, said closure member comprising a thin walled springy backing annulus and a rubber-like cover for said annulus, said closure member having rolling contact with the wall portion of said chamber, said cylindrical wall portion extending at least 90° to one side of said port, control means for rolling said closure member to and from a position overlying said port, said control means comprising a shaft concentric with said chamber wall portion and operator means carried by said shaft engaging the said springy backing annulus, said operator means being of smaller section than the internal diameter of said annulus whereby said annulus may flex as the closure member rolls across said port.

7. A valve comprising a body having a chamber formed therein and an inlet port for said chamber, a wall portion of said chamber having a cylindrical surface, an outlet port in said wall portion the margin of said port lying within the cylindrical surface of said wall portion, a generally annular closure member for said outlet port having a wall of uniform thickness, said closure member having rolling contact with the wall portion of said chamber, said cylindrical wall portion extending at least 90° to one side of said port, control means for rolling said closure member to and from a position overlying said outlet port, said control means comprising a shaft substantially concentric with said chamber wall portion and operator means carried by said shaft extending within and engaging the inner wall of said closure member, said operator means being of smaller section than the internal diameter of said annulus to apply local pressure tending to close said outlet port.

8. A valve comprising a body having a chamber formed therein, a wall portion of said chamber having a cylindrical surface, a port in said wall portion, a generally annular closure member having a resilient outer face with an outer diameter less than the internal diameter of said chamber wall portion and an internal diameter greater than the internal radius of said chamber wall portion, control means for moving said closure member over the chamber wall and to and from a position overlying said port, said control means comprising a shaft substantially concentric with said chamber wall portion and an operator carried by said shaft engaging the said internal wall portion of said closure member to urge said resilient face against the wall of said chamber, said operator being of smaller section than the internal diameter of said closure member, the coefficient of friction between said operator and internal wall portion of the closure member being less than that between the cylindrical wall surface of the chamber and the resilient closure face when the closure member overlies the port, said first-named coefficient of friction being greater than that between said resilient closure face and the cylindrical chamber wall when the closure clears the port with fluid in the valve, whereby said closure member rolls across said port and slides along the chamber wall spaced from the port to present new surfaces to the port as the valve is operated.

9. A valve comprising a body having a chamber formed therein, a wall portion of said chamber having a cylindrical surface, a port in said wall portion the margin of said port lying within the cylindrical surface of said wall portion, a relatively thin-walled curved, springy closure member for said port, said closure member having a smaller radius of curvature than that of said cylindrical wall surface, said closure member being of uniform wall thickness and having rolling contact with the wall portion of said chamber, said cylindrical wall portion extending at least 90° to one side of said port, control means for rolling said closure member to and from a position overlying said port, said control means comprising a shaft substantially concentric with said cylindrical chamber wall portion and eccentric operator means carried by said shaft, said operator means having a curved nose in engagement with, and of smaller radius than, that of the inner surface of said closure member, said operator means being otherwise clear of said closure member, whereby said closure member may flex as said curved nose rolls the closure member rolls across said port.

10. A valve comprising a body having a chamber formed therein, a wall portion of said chamber having a cylindrical surface, a port in said wall portion the margin of said port lying within the cylindrical surface of said wall portion, a relatively thin-walled curved, springy closure member for said port, said closure member having a smaller radius of curvature than that of said cylindrical wall surface, said closure member being of uniform wall thickness and having rolling contact with the wall portion of said chamber, said cylindrical wall portion extending at least 90° to one side of said port, control means for rolling said closure member to and from a position overlying said port, said control means comprising a shaft substantially concentric with said cylindrical chamber wall portion and eccentric operator means carried by said shaft, said operator means having a curved nose portion in engagement with and of smaller radius than that of the inner surface of said closure member, said operator means being otherwise clear of said closure member, and spring means on said control means to urge said curved nose portion against said closure member, whereby said closure member may flex as said curved nose rolls the closure member rolls across said port.

LOUIS B. COURTOT.

REFERENCES CITED

The following references are of record in the file of this patent:

UNITED STATES PATENTS

| Number | Name | Date |
| --- | --- | --- |
| 109,730 | Hanks | Nov. 29, 1870 |
| 160,640 | Bird | Mar. 9, 1875 |
| 756,492 | Gold | Apr. 5, 1904 |
| 870,377 | Marett | Nov. 5, 1907 |
| 1,028,134 | Raymaker | June 4, 1912 |
| 1,755,057 | Fagan | Apr. 15, 1930 |
| 2,431,593 | Strike | Nov. 25, 1947 |

FOREIGN PATENTS

| Number | Country | Date |
| --- | --- | --- |
| 624,406 | Germany | Dec. 24, 1935 |